(12) United States Patent
Cam-Winget et al.

(10) Patent No.: US 9,876,824 B2
(45) Date of Patent: *Jan. 23, 2018

(54) POLICY-BASED CONTROL LAYER IN A COMMUNICATION FABRIC

(71) Applicant: Cisco Technology, Inc., San Jose, CA (US)

(72) Inventors: Nancy Cam-Winget, Mountain View, CA (US); Allan Thomson, Pleasanton, CA (US); Pok Wong, San Jose, CA (US); Vanaja Ravi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/930,159

(22) Filed: Nov. 2, 2015

(65) Prior Publication Data

US 2016/0072843 A1   Mar. 10, 2016

Related U.S. Application Data

(63) Continuation of application No. 13/913,621, filed on Jun. 10, 2013, now Pat. No. 9,208,295.

(60) Provisional application No. 61/714,333, filed on Oct. 16, 2012.

(51) Int. Cl.
| | |
|---|---|
| *H04L 29/00* | (2006.01) |
| *H04L 29/06* | (2006.01) |
| *G06F 21/30* | (2013.01) |
| *G06F 21/62* | (2013.01) |
| *G06F 9/54* | (2006.01) |

(52) U.S. Cl.
CPC .............. *H04L 63/20* (2013.01); *G06F 9/542* (2013.01); *G06F 21/30* (2013.01); *G06F 21/6218* (2013.01); *H04L 63/105* (2013.01); *H04L 63/107* (2013.01); *H04L 63/08* (2013.01)

(58) Field of Classification Search
CPC ..... H04L 63/20; H04L 63/105; H04L 63/107; G06F 9/542; G06F 21/6218; G06F 21/30
See application file for complete search history.

(56) References Cited

U.S. PATENT DOCUMENTS

| | | | |
|---|---|---|---|
| 7,477,747 B2 | 1/2009 | Stieglitz et al. | |
| 7,558,960 B2 | 7/2009 | Cam Winget et al. | |
| 7,604,746 B2 | 10/2009 | Calhoun et al. | |
| 7,640,430 B2 | 12/2009 | Zhou et al. | |
| 7,882,349 B2 | 2/2011 | Cam-Winget et al. | |
| 7,966,489 B2 | 6/2011 | Cam-Winget et al. | |
| 8,191,144 B2 | 5/2012 | Cam Winget et al. | |
| 8,327,432 B2 | 12/2012 | Wong et al. | |
| 8,365,256 B2 | 1/2013 | Wong et al. | |
| 8,719,919 B2 * | 5/2014 | Rice ........................ | H04L 67/16 726/1 |

(Continued)

*Primary Examiner* — Brandon Hoffman
*Assistant Examiner* — Helai Salehi
(74) *Attorney, Agent, or Firm* — Edell, Shapiro & Finnan, LLC

(57) ABSTRACT

Presented herein are techniques for adding a secure control layer to a distributed communication fabric that supports publish-subscribe (pub-sub) and direct query (synchronization) communication. The secure control layer is configured to perform policy-based authentication techniques to securely manage the exchange of data/information within the communication fabric and enable registration/discovery of new capabilities.

17 Claims, 4 Drawing Sheets

(56) References Cited

U.S. PATENT DOCUMENTS

2007/0016669 A1* 1/2007 Butler .................... G06Q 30/06
709/224
2009/0300760 A1 12/2009 Chitor et al.

* cited by examiner

POLICY-BASED CONTROL LAYER IN A COMMUNICATION FABRIC

RELATED APPLICATIONS

The present application is a continuation application of U.S. Non-provisional application Ser. No. 13/913,621 filed Jun. 10, 2013, entitled "POLICY-BASED CONTROL LAYER IN A COMMUNICATION FABRIC," which claims priority to U.S. Provisional Patent Application No. 61/714,333 filed Oct. 16, 2012, entitled "SECURE CONTROL LAYER IN A DISTRIBUTED COMMUNICATION SYSTEM." The contents of these applications are hereby incorporated by reference herein.

TECHNICAL FIELD

The present disclosure relates generally to communications fabrics.

BACKGROUND

There are many different devices, applications, services, servers, etc. (collectively referred to herein as computing components) available from different vendors that perform various operations within a computing network and/or provide information to the network. In order for these various computing components to perform their operations, the components often obtain information/data from one or more other sources (e.g., other devices, applications, services, servers, mobile devices, etc.).

Different types of information may be produced or used by different computing components. In one example, this information includes security information. Security information may include, but is not limited to: raw security events, network flow information, identity information, security configuration information, security intelligence information, reputation information, correlated security analysis, and security reports. Security information may also include: indexes of information, policy, configuration settings, topology (physical, layer 2, and/or layer 3), network flow information, deep packet inspection of data and control plane traffic, control plane events, content security events, policy (e.g., network, control, endpoint), posture assessment information, compliance rules and assessment, profiling assessment information, statistical counts and analysis of the statistics on traffic patterns, etc.

DESCRIPTION OF EXAMPLE EMBODIMENTS

Overview

Presented herein are techniques for adding a secure control layer to a distributed communication fabric that supports publish-subscribe (pub-sub) and direct query (synchronization) communication. The secure control layer is configured to perform policy-based authentication and authorization techniques to securely manage the exchange of data/information within the communication fabric and to enable registration of new capabilities within the communication fabric. The techniques presented herein may be implemented with any communication protocol that supports pub-sub and/or direct query patterns between a source of information (publisher) and a destination of the information (consumer) where the protocol exchanges between source and destination are controlled by a separate control plane entity, referred to herein as a grid controller.

Example Embodiments

Software-defined networking (SDN) is an approach to networking that separates the control plane from the data plane. Using SDN, the control plane is implemented in software in a system (e.g., networking device, server, etc.) that is physically separate from the data plane. The evolution of SDNs, coupled with the wide variety of devices available for use, has increased the need to establish appropriate secure relationships and authorizations between the network infrastructure components to ensure that the information and programming of the network is executed with trusted and authorized parties. Although different application programming interfaces (APIs) have been developed to facilitate the programmability at different levels of the Open Systems Interconnection (OSI) stack, no such APIs are focused on contextual information that can be leveraged for security, network health, network management, etc., particularly in networks that include public/hybrid clouds and that span multiple domains. Presented herein are techniques to define the conditions by which these APIs can be executed in a secure manner so as not to affect network operation or present new threat vectors (e.g. means by which security breaches can be enabled). In cases where the control plane is acquiring information, for example, for cybersecurity, manageability or to continue to update/control the network, the techniques ensure that the obtained data is trustworthy (i.e., the data is both protected and has originated from an authorized source).

Figure 1:
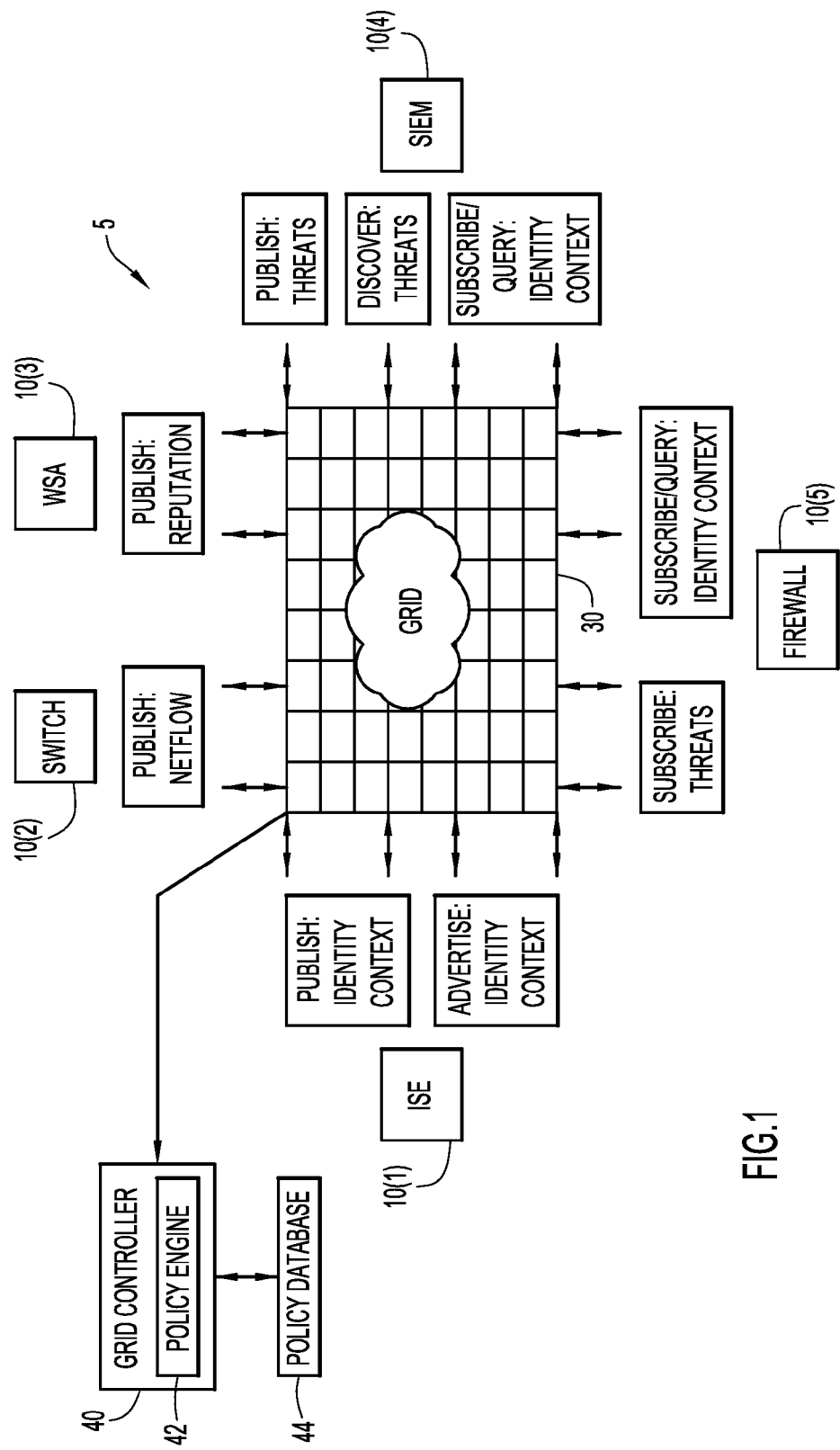
FIG. 1 is a schematic diagram of a computing environment in accordance with examples presented herein.

FIG. 1 is a schematic diagram of a computing environment 5 in accordance with examples presented herein that comprises multiple components 10(1)-10(5) (e.g., devices, applications, services, servers, etc.) that span physical, network and security infrastructures. These components may take a number of different forms, but are configured to be connected (directly or indirectly) to a communication fabric 30. For ease of reference, the components 10(1)-10(5) are collectively and generally referred to herein as computing elements or components.

Computing components 10(1)-10(5) may be configured to generate data/information that is useable by other computing components (i.e., the computing components may operate as publishers of data). In such circumstances, a computing component may be referred to herein as a "publisher." Additionally or alternatively, computing components 10(1)-10(5) may be configured to use (consume) data/information generated by other computing components. In such circumstances, a computing component may be referred to herein as a "consumer."

The communication fabric 30 enables publishers to share data with the consumers. The communication fabric 30, which is sometimes referred to herein as a grid infrastructure or simply "grid," is a logical arrangement of hardware/ software elements implemented in one or more interconnected computing devices (e.g., servers, controllers, switches, routers, firewalls, access points, etc.) that collectively function as a logical communication bus linking the discrete computing components 10(1)-10(5). The ability to provide data to, or consume data from, the grid is sometimes referred to herein as a "capability" or "service." As such, different "capabilities" or "services" refer to different types of data made available to, or consumed from, the grid.

It is to be appreciated that computing components 10(1)-10(5) may be any element that can connected to the grid 30, including, but not limited to services, archives, network security devices (e.g., compliance check service, firewalls, etc.), wireless local area network (WLAN) controllers, access points, policy enforcement services, network management software, servers (virtual private network (VPN) termination servers, video servers, etc.), clients, laptops, mobile devices (e.g., smartphones), data centers, etc. In the specific example of FIG. 1, computing component 10(1) is an Identity Services Engine (ISE), computing component 10(2) is a switch, computing component 10(3) is a Web Security System (WSA), computing component 10(4) is Security Information and Event Management device (SIEM), and computing component 10(5) is a firewall.

As noted above, the computing components 10(1)-10(5) may publish data to, and/or consume data from, the grid 30. In the example of FIG. 1, ISE 10(1) is configured to publish identity context data to the grid 30, switch 10(2) is configured to publish flow data (e.g., Netflow information) to the grid 30, and WSA 10(3) is configured to publish reputation data to the grid 30. As such, ISE 10(1), switch 10(2), and WSA 10 (3) operate, in this example, as publishers. Additionally, SIEM 10(4) is configured to publish threat data to the grid 30 and is configured to consume identity context data published by the ISE 10(1). SIEM 10(4) may consume this identity context data via a pub-sub mechanism (i.e., through a subscription to identity context information generated at ISE 10(1)) or via a query mechanism (i.e., through a query request to ISE 10(1)). As such, SIEM 10(4) operates both as a publisher and as a consumer. Finally, firewall 10(5) is configured to consume threat data published by the SEIM 10(4) and identity context data published by the ISE 10(1). The firewall 10(5) may consume the threat data via a pub-sub mechanism and may consume the identity context data via a pub-sub mechanism or via a query mechanism.

Certain computing components connected to grid 30 may advertise capabilities that the components make available to the grid. In the example of FIG. 1, the ISE 10(1) advertises the ability to provide identity context data. Additionally, certain network elements connected to a communication fabric may perform capability discover (i.e., discover capabilities available to the grid). In the example of FIG. 1, the SIEM 10(4) is configured to perform such capability discovery.

As noted above, there will be entities (e.g., computing components 10(1)-10(5)) that connect to grid 30 to (1) publish data, (2) subscribe to data, (3) query data, (4) register new capabilities, and/or (5) discover new capabilities. The computing components 10(1)-10(5) may perform one or a combination of these operations. The computing components 10(1)-10(5) and the allowed operations are each authorized through a policy mechanism executed at a grid controller 40.

The grid controller 40 is a control plane entity that is abstractly connected to all of the hardware/software elements in the grid 30 as well as the computing components 10(1)-10(5). The grid controller 40 may comprise a software application executed by one or more servers (e.g., Xen Cloud Platform (XCP) servers). In general, the grid controller 40, and, more particularly a policy engine 42, is configured to provide policy-based authentication and authorization of computing components 10(1)-10(5) to the grid 30. Furthermore, the grid controller 40 (i.e., policy engine 42), is configured to enable the exchange of information between publishers and consumers and allow certain components to register new capabilities. The information exchanges may include multicast (e.g., pub-sub) and unicast/query (i.e., peer-to-peer) information exchanges across the grid 30.

In accordance with examples presented herein, the policy engine 42 performs an authentication process to authenticate a computing component when the computing component initiates connection to the grid 30. The policy engine also performs an authorization process to authorize the computing component. These authentication and authorization processes determine whether or not the computing component is allowed to participate in the grid. The policy engine is also configured to perform additional authorization processes when new operations (e.g., publish, subscribe, query, register new capabilities, and/or discover new capabilities) are requested by the computing component. Furthermore, a policy may dictate that the policy engine 42 periodically or continuously checks for compliance of policy so revocation of the authorizations can also ensue (e.g., an authorization for the computing component may be revoked if it is detected that the component is no longer in compliance).

The authentication and authorization processes may be performed using policies stored in a policy database 44. The policies may include, for example, compliance checking, type of component, location, role, etc., and enable dynamic authentication/authorization of the entities and associated operations. The policies may define which capabilities/services exist and the rules by which new additional capabilities/services may be registered, which capabilities/services the computing components are allowed to publish on the communication fabric, which capabilities/services the computing components are allowed to consume, etc. As such, beyond the existence of the capabilities, there may also be policies that define how each of the capabilities may function (e.g. the types of entities that can publish or subscribe. The grid controller 40 may also provide a mechanism by which computing components can, for example, discover the control plane, advertise its capabilities, and establish a secure connection to affect its APIs in the control plane. The grid controller 30 also maintains a service directory of all authenticated and authorized services connected to the fabric that sit on top of the message infrastructure.

Conventional messaging systems identify a computing component type and simply infer, based on a predefined (static) rule or simple authentication validation, that the computing component should be allowed to perform certain operations. For example, if a computing component joins a communication fabric and identifies itself as an ISE, a conventional system may determine that since the computing component identified itself as an ISE, it should be automatically be allowed to perform certain operations (i.e., share identity context). Such authentication techniques based on predefined rules may be problematic and do not account for the dynamic nature of computing networks.

In accordance with examples presented herein, policy-based authentication/authorization of a computing component and/or requested operation(s) within a messaging system is provided. The policy-based authentication/authorization (control) techniques presented herein are dynamic and based on the different attributes that make up a policy. Attributes that can enable or limit authorization include, but are not limited to: device type (e.g., distinguishers of whether a computing component is a physical or virtual device), device location (e.g., geographic or network topological location of a computing component), device service(s) (e.g., whether the box is configured to run as a switch, router, ISE, etc.), device compliance (e.g., checks against system configuration such as running software, hardware configuration, etc.), device reputation (e.g., known or determined reliability of the device and/or data produced by a device), data reputation (e.g., known or determined reliability of published data), application role, etc. There may also be various exceptions and further includes (e.g., Time-of-day).

Table 1, below illustrates example attribute evaluations that may be performed at policy engine 42 in accordance with policy-based authorization techniques presented herein.

direct some other operation based on this result). Similar time flows may be enacted by other computing components connected to grid 30.

In certain examples presented herein, the grid controller 40 provides for dynamic registration of new services/capabilities. In general, the grid controller creates a service directory of available services. A joining computing component is provided with the ability to "create" a new service that is to be registered with the grid controller 40 (e.g., added to the service directory) and/or discover what services are available through the grid 30.

Figure 2:
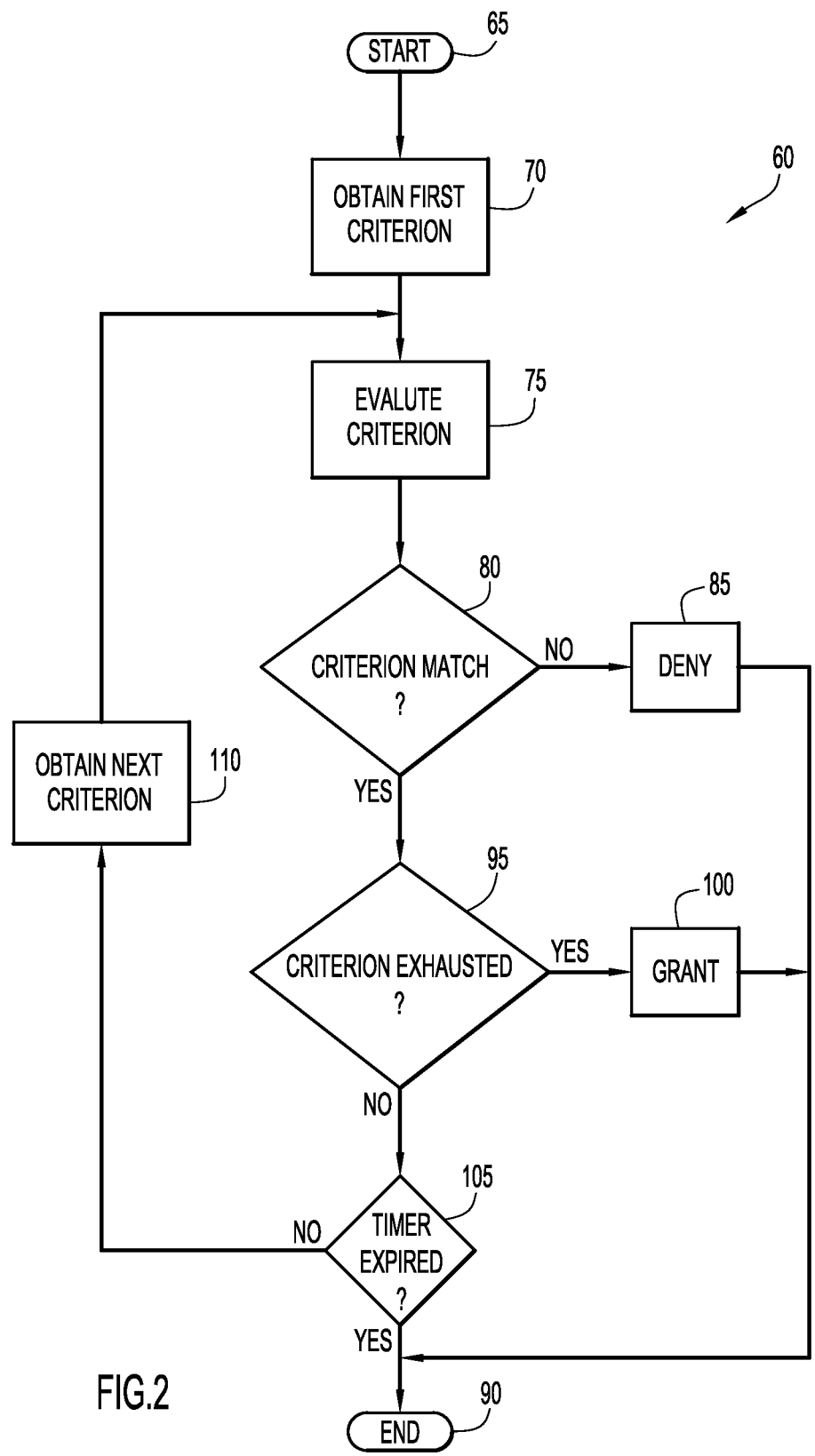
FIG. 2 is a flowchart of a method of policy-based authentication/authorization techniques in accordance with examples presented herein.

FIG. 2 is a flowchart of a method 60 for authorization of an operation requested by a computing component in accordance with examples presented herein. Method 60 starts at 65 and, at 70, a first "criterion" is obtained. In the example of FIG. 2, an "authorization criterion" is defined by a policy that is driven by a set of attributes (which can be nested). In general, a policy is a set of rules that result in an authorization result and the rules in a policy are the "criteria." As

| Attribute Decision | Description |
| --- | --- |
| Request equals <Publish\|Subscribe\|Query\|Advertise Capabilities\|Discover Capabilities> | Evaluate type of operations request |
| Device Type equals <Physical\|Virtual> | Evaluate if device is a physical hardware or a virtual instance |
| Consumer GeoLocation equals <Locality> | Evaluate where the recipient of data locates geographically |
| Publisher GeoLocation equals <Locality> | Evaluate where the sender of data locates geographically |
| Consumer Network Location equals <subnet> | Evaluate network location of the recipient of data |
| Publisher Network Location equals <subnet> | Evaluate network location of the sender of data |
| Service equals <switch\|router\|SIEM\|WSA\|ISE\|firewall . . . > | Evaluate services may be running on a physical or virtual server instance |
| Reputation equals <poor\|fair\|good\|excellent> | Evaluate reputation of the publisher via data from analytic and reputational engines |
| Data Accuracy equals <poor\|fair\|good\|excellent> | Evaluate reputation of the data via data from analytic and reputational engines |
| Application equals <list of applications> | Evaluate applications |
| License equals <base\|intermediate\|advanced> | Evaluate licenses |
| Device Compliance equals <compliant\|noncompliant\|unknown | Evaluate the posture of the system, if it is infected with virus, the running software version, known vulnerabilities with applications and operating system, hardware configuration such as whether USB port is enabled |

In one specific example time flow of FIG. 1, ISE 10(1) authenticates to grid 30 at time t0. At time t1, the monitoring (MnT) function of ISE 10(1) registers to publish identity context data. The grid controller 40 (policy engine 42) then determines the location of ISE 10(1) and based on its configuration (i.e., is MnT persona), determines that as a MnT node it can authorize the registration request. At time t2, the MnT function of ISE 10(1) registers to publish flow information (e.g., Netflow information). The grid controller 40 (policy engine 42) determines that the MnT function of ISE 10(1) is not authorized (allowed) to publish the flow information into the grid 30, thus the request is denied.

The ISE 10(1) continues to publish the identity context data, as noted, but at time tN the ISE 10(1) becomes infected with malware. The grid controller 40 (policy engine 42) performs continuous/periodic authorization checks on compliance and reputation such that at tN it detects the break in compliance. As such, at that time the policy engine 42 revokes the previously granted authorization such that the ISE 10(1) is not longer allowed to publish (or the policy may such, the criteria can be described as a set of rules, where each rule can be defined by a set of conditions that are evaluated for a result. In certain circumstances, the conditions can be a set of rules themselves (that is, they can be nested). At 75, the first criterion is evaluated and at 80 a determination is made as to whether the criterion "matches." A "match" is, in essence, a determination that the criterion has been positively satisfied. If it is determined at 80 that the criterion does not match, then at 85 the operation requested by the computing component is denied. In accordance with examples presented herein, a denial determination (i.e., a non-satisfied criterion) may not result in a complete denial. In certain circumstances, a denial may refer to placing restrictions on the requested operation (e.g., limited access or restricted authorization). In one example, restricted operation may be that the computing component is restricted such that it can only obtain pieces of information from a particular service. The method 60 then ends at 90. However, if it is determined at 80 that the criterion does match (i.e., a positive satisfaction of the criterion), then at 95 a determination is made as to whether all available criteria have been exhausted. If the criteria have been exhausted, then the operation is granted at 100 and the method ends at 90. If it is determined at 95 that all of the criteria have not been exhausted, then at 105 a determination is made as to whether an authorization timer has expired. The timer is used to limit the evaluation period in cases where evaluation processing is slow or there is a large number of criteria. Typically, there is an expectation for a system to make evaluation within a certain period of time, where the period is selectable.

If the timer has expired, the method ends at 90. However, if it is determined that the timer has not expired, then at 110 the next authorization criterion is obtained and the method returns to 75. The method continues until (1) a criterion fails to match, (2) the authorization criteria are exhausted, or (3) the authorization timer expires.

Figure 3:
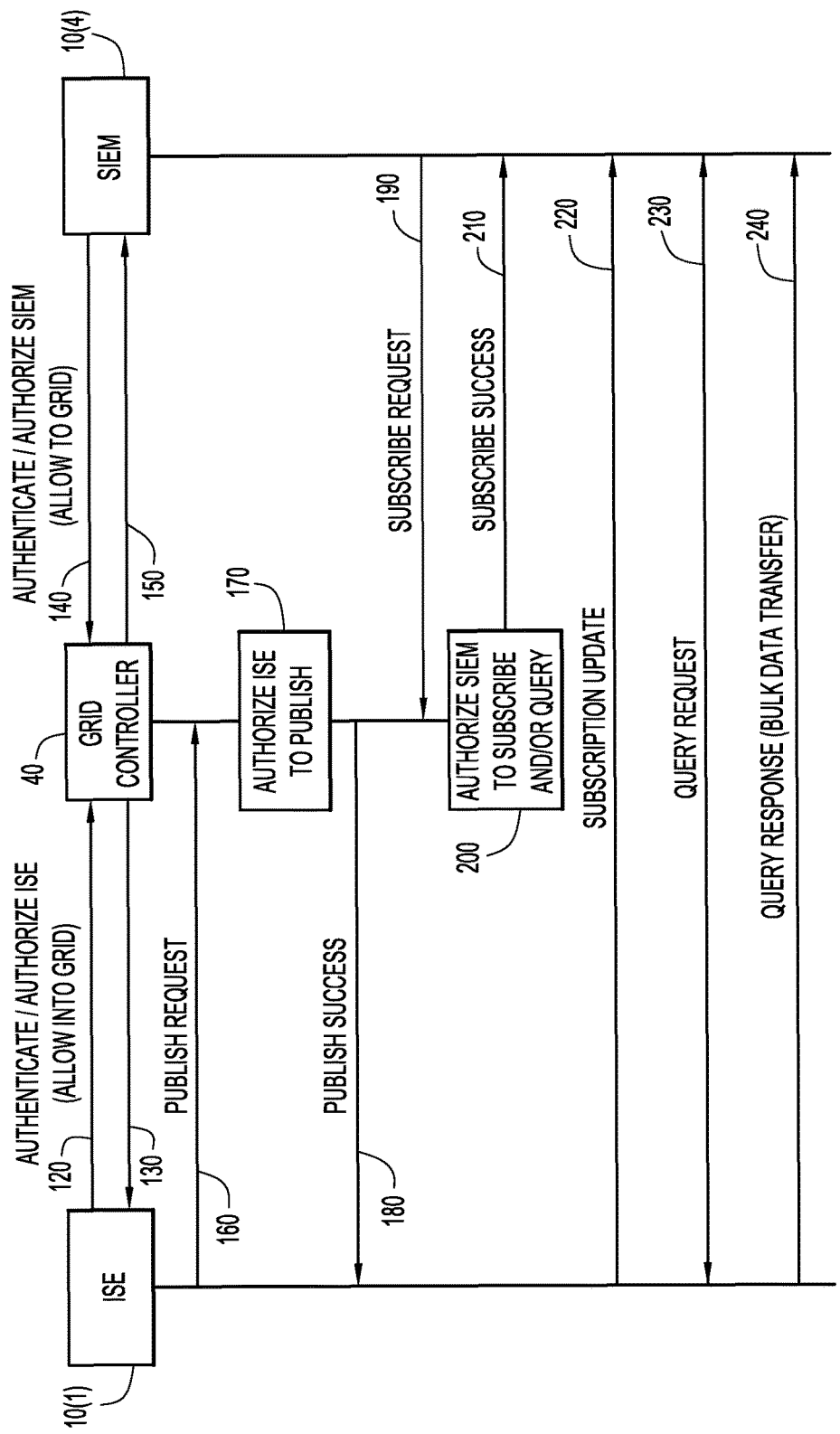
FIG. 3 is a flow diagram illustrating policy-based authentication/authorization techniques in accordance with examples presented herein.

FIG. 3 is a flow diagram in accordance with examples presented herein. For ease of reference, the flow diagram of FIG. 3 is described with reference to elements of FIG. 1, namely ISE 10(1), grid 30, grid controller 40, and SEIM 10(4). In this example, the ISE 10(1) operates as a publisher and the SIEM 10(4) operates as a consumer.

The ISE 10(1) first initiates connection to (i.e., attempts to join) the grid 30 and the grid controller 40 (i.e., policy engine 42 of the grid controller) authenticates and authorizes the ISE 10(1). That is, using policy-based authentication/authorization techniques described herein, the grid controller 40 determines if the ISE 10(1) is allowed to join the grid 30. The authentication/authorization exchange between the ISE 10(1) and grid controller 40 is represented in FIG. 3 by arrows 120 and 130. However, it is to be appreciated that this authentication/authorization exchange may be initiated by either entity and may include the exchange of multiple messages.

Additionally, in the example of FIG. 3 the SIEM 10(4) initiates connection to the grid 30 and the grid controller 40 authenticates and authorizes the SIEM 10(4). That is, using policy-based authentication/authorization techniques described herein, the grid controller 40 determines if the SIEM 10(4) is allowed to join the grid 30. The authentication/authorization exchange between the SIEM 10(4) and grid controller 40 is represented in FIG. 3 by arrows 140 and 150. However, it is to be appreciated that this authentication/authorization exchange may be initiated by either entity and may include the exchange of multiple messages.

After authentication and authorization to the grid 30, the ISE 10(1) issues a publish request message to grid controller 40. The publish request message, represented in FIG. 3 by arrow 160, indicates that the ISE 10(1) has data for publication on the grid 30. Following receipt of the publish request message, at 170 the grid controller 40 authorizes (based on one or more polices) the ISE 10(1) to publish data onto the grid. More specifically, the grid controller 40 executes a policy-based authorization process as described elsewhere herein to determine if the ISE 10(1) is allowed to publish data onto the grid 30. In this case, the ISE 10(1) is allowed to publish data and the grid controller 40 transmits a publish success message to ISE 10(1). The publish success message is represented in FIG. 3 by arrow 180 and, subsequently, the ISE 10(1) may publish data periodically or continuously to the grid 30.

After authentication to the grid 30, the SIEM 10(4) issues a subscribe request message to grid controller 40. The subscribe request message, represented in FIG. 3 by arrow 190, indicates that the SIEM 10(4) is requesting to subscribe to data provided to the grid 30. The subscribe request may include an indication of a subscription entity (e.g., identifying the specific entity, the type of entity, etc., to which the SIEM 10(4) is attempting to subscribe) or may include an indication of subscription data (e.g., identifying the specific data, the type of data, etc., to which the SIEM 10(4) is attempting to subscribe). Following receipt of the subscribe request message, at 200 the grid controller 40 authorizes (based on one or more polices) the SIEM 10(4) to subscribe to data from the grid 30. More specifically, the grid controller 40 executes a policy-based authorization process as described elsewhere herein to determine if the ISE 10(1) is allowed to subscribe to data on the grid 30. In this case, the SIEM 10(4) is allowed to subscribe to data from ISE 10(1) and the grid controller 40 transmits a subscribe success message to SIEM 10(4). The subscribe success message is represented in FIG. 3 by arrow 210.

In operation, the ISE 10(1) may issue subscription updates onto the grid 30. As shown by arrow 220 in FIG. 3, the data provided to the grid 30 by these subscription updates is forwarded through the grid to SIEM 10(4). In addition or alternatively, in certain examples the SIEM 10(4) may also be authorized to query data from ISE 10(1). In such examples, the SIEM 10(4) may transmit a query request to ISE 10(1) which is represented in FIG. 3 by arrow 230. The ISE 10(1) may then respond with a query response that is, in essence, a bulk transfer of data to the SIEM 10(4). The query response is represented in FIG. 3 by arrow 240.

Figure 4:
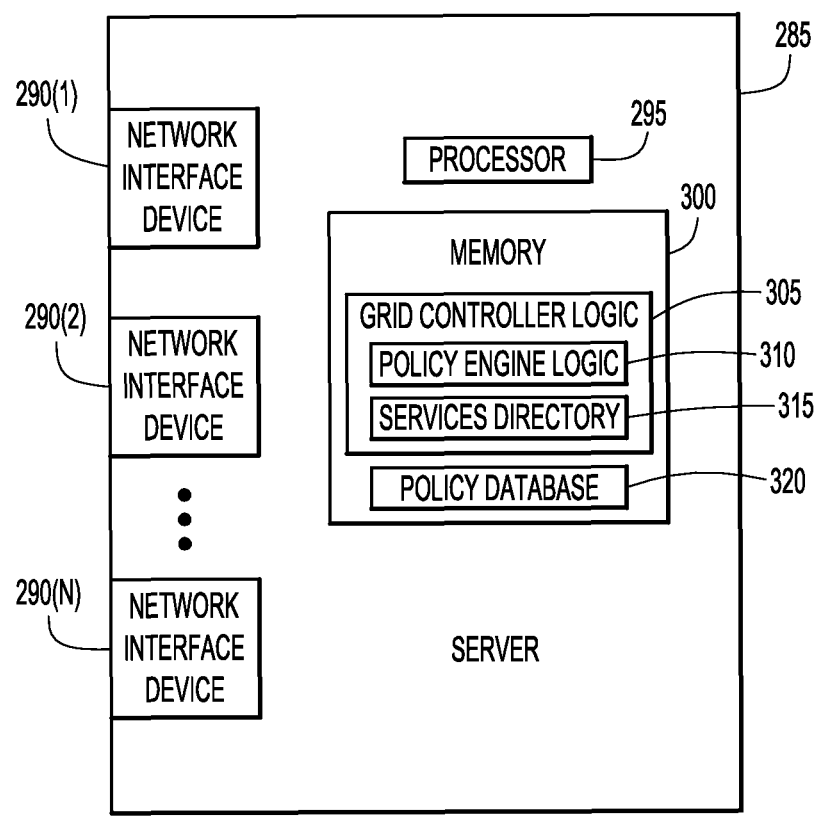
FIG. 4 is a block diagram of a server in accordance with examples presented herein.

FIG. 4 is a block diagram illustrating one example in which a grid controller is, at least partially, implemented on a server 285. That is, server 285 executes the functionality of a grid controller as described above. Server 285 may be, for example, one or more XCP servers. As shown, server 285 comprises a plurality of network interface devices 290(1)-290(N), a processor 295, and a memory 300. Memory 300 includes grid controller logic 305 comprising policy engine logic 310 and a service directory 315. Memory 300 also comprises a policy database 320.

Memory 300 may comprise read only memory (ROM), random access memory (RAM), magnetic disk storage media devices, optical storage media devices, flash memory devices, electrical, optical, or other physical/tangible memory storage devices. The processor 295 is, for example, a microprocessor or microcontroller that executes instructions for the grid controller logic 305. Thus, in general, the memory 300 may comprise one or more tangible (i.e., non-transitory) computer readable storage media (e.g., a memory device) encoded with software comprising computer executable instructions and when the software is executed (by the processor 295) it is operable to perform the operations described herein in connection with grid controller logic 305 (i.e., the functionality described above for grid controller 40, including the policy engine 42).

The techniques presented herein provide a software defined control plane that uses a communication fabric (e.g., an XMPP infrastructure) for secure bi-directional transport. The techniques presented also provide a binding of policy computing components (i.e., any component that can connect to a network) and their services connected to the communication fabric such that all communication by those computing components are authenticated and authorized. Additionally, the techniques presented herein provide a service directory construct that is maintained by the controller such that systems connecting to the communication fabric can discover what services are available and authorized for use. The techniques presented herein also enable directed peer-to-peer communication where appropriate while using the controller/control plane over the communication fabric to maintain authentication/authorization. Finally, the techniques presented herein achieve better information delivery resiliency and load balance. The control plane performs matchmaking of communicating ends for directed communication takes place, and should a peer become unavailable, the controller will perform alternate matchmaking that could handle the publication or information query. This alleviates the situation in a peer-to-peer network where peers are on their own to discover alternatives.

The above description is intended by way of example only.

What is claimed is:

1. A method comprising:
receiving, at a controller of a communication fabric, a publication request from a first component of a plurality of components connected to the communication fabric to publish threat data to the communication fabric, wherein the publication request is received on a control plane of the communication fabric that is physically separated from a data plane of the communication fabric;
determining, by the controller according to policy-based authorization, that the first component is permitted to publish threat data to the communication fabric, wherein the controller is connected to each of the plurality of components connected to the communication fabric to provide policy-based authentication and the policy-based authorization for each of the plurality of components on the control plane;
receiving, at the controller, a subscribe request from a second component of the plurality of components connected to the communication fabric to subscribe to threat data published by the first component;
determining, by the controller according to the policy-based authorization, that the second component is permitted to subscribe to the threat data published by the first component, wherein the policy-based authorization includes policies governing publication of data, subscription to published data, querying data, registering new services, or discovering new services to and from the communication fabric;
receiving, at the controller, a join request from a third component of the plurality of components connected to the communication fabric to join the communication fabric;
determining, by the controller according to the policy-based authentication, that the third component is allowed to join the communication fabric;
receiving, at the controller, a publication request from the third component to publish identity context data to the communication fabric; and
determining, by the controller according to the policy-based authorization, that the third component is permitted to publish identity context data to the communication fabric.

2. The method of claim 1, further comprising:
receiving, at the controller, a subscribe request from the first component to subscribe to identity context data published by the third component; and
determining, by the controller according to the policy-based authorization, that the first component is permitted to subscribe to the identity context data published by the third component.

3. The method of claim 1, further comprising:
receiving, at the controller, a query request from the second component to query the identity context data published by the third component; and determining, by the controller according to the policy-based authorization, that the second component is permitted to query the identity context data published by the third component.

4. The method of claim 1, wherein performing the policy-based authorization comprises:
evaluating one or more attributes defined in a policy.

5. The method of claim 1, further comprising:
authorizing, by the controller according to the policy-based authorization, one or more components to add a new service to a service directory of the controller.

6. The method of claim 1, further comprising:
authorizing one or more components to discover new services available through the communication fabric.

7. The method of claim 4, wherein evaluating one or more attributes comprises: evaluating a component location.

8. The method of claim 4, wherein evaluating one or more attributes comprises: evaluating component compliance.

9. The method of claim 4, wherein evaluating one or more attributes comprises: evaluating one or more of component reputation and data reputation.

10. An apparatus comprising:
one or more network interfaces for connection to a communication fabric; a memory; and
a processor coupled to the one or more network interfaces and the memory, and configured to:
receive a publication request from a first component of a plurality of components connected to a communication fabric to publish threat data to the communication fabric, wherein the publication request is received on a control plane of the communication fabric that is physically separated from a data plane of the communication fabric;
determine, according to policy-based authorization, that the first component is permitted to publish threat data to the communication fabric, wherein the apparatus is connected to each of the plurality of components connected to the communication fabric to provide policy-based authentication and the policy-based authorization for each of the plurality of components on the control plane;
receive a subscribe request from a second component of the plurality of components connected to the communication fabric to subscribe to threat data published by the first component;
determine, according to the policy-based authorization, that the second component is permitted to subscribe to the threat data published by the first component, wherein the policy-based authorization includes policies governing publication of data, subscription to published data, querying data, registering new services, or discovering new services to and from the communication fabric;
receive a join request from a third component of the plurality of components connected to the communication fabric to join the communication fabric;
determine, according to the policy-based authentication, that the third component is allowed to join the communication fabric;
receive, a publication request from the third component to publish identity context data to the communication fabric; and
determine, according to the policy-based authorization, that the third component is permitted to publish identity context data to the communication fabric.

11. The apparatus of claim 10, wherein the processor is further configured to:

receive a subscribe request from the first component to subscribe to identity context data published by the third component; and determine, according to the policy-based authorization, that the first component is permitted to subscribe to the identity context data published by the third component.

12. The apparatus of claim 10, wherein the processor is further configured to:

receive a query request from the second component to query the identity context data published by the third component; and determine, according to the policy-based authorization, that the second component is permitted to query the identity context data published by the third component.

13. The apparatus of claim 10, wherein the processor is further configured to:

authorize, according to the policy-based authorization, one or more components to add a new service to a service directory of the controller;

authorize, according to the policy-based authorization, one or more components to discover new services available through the communication fabric; and perform the policy-based authorization by evaluating one or more attributes defined in a policy including:
evaluating a component location;
evaluating component compliance; or
evaluating one or more of component reputation and data reputation.

14. A non-transitory computer-readable storage media encoded with software comprising computer executable instructions and when the software is executed operable to:

receive a publication request from a first component of a plurality of components connected to a communication fabric to publish threat data to the communication fabric, wherein the publication request is received on a control plane of the communication fabric that is physically separated from a data plane of the communication fabric;

determine, according to policy-based authorization, that the first component is permitted to publish threat data to the communication fabric, wherein the plurality of components are connected to the communication fabric to provide policy-based authentication and the policy-based authorization for each of the plurality of components on the control plane;

receive a subscribe request from a second component of the plurality of components connected to the communication fabric to subscribe to threat data published by the first component;

determine, according to the policy-based authorization, that the second component is permitted to subscribe to the threat data published by the first component, wherein the policy-based authorization includes policies governing publication of data, subscription to published data, querying data, registering new services, or discovering new services to and from the communication fabric;

receive a join request from a third component of the plurality of components connected to the communication fabric to join the communication fabric;

determine, according to the policy-based authentication, that the third component is allowed to join the communication fabric;

receive, a publication request from the third component to publish identity context data to the communication fabric; and determine, according to the policy-based authorization, that the third component is permitted to publish identity context data to the communication fabric.

15. The non-transitory computer-readable storage media of claim 14, further comprising instructions operable to:

receive a subscribe request from the first component to subscribe to identity context data published by the third component; and determine, according to the policy-based authorization, that the first component is permitted to subscribe to the identity context data published by the third component.

16. The non-transitory computer-readable storage media of claim 14, further comprising instructions operable to:

receive a query request from the second component to query the identity context data published by the third component; and determine, according to the policy-based authorization, that the second component is permitted to query the identity context data published by the third component.

17. The non-transitory computer-readable storage media of claim 14, further comprising instructions operable to:

authorize, according to the policy-based authorization, one or more components to add a new service to a service directory of the controller;

authorize, according to the policy-based authorization, one or more components to discover new services available through the communication fabric; and perform the policy-based authorization by evaluating one or more attributes defined in a policy including:
evaluating a component location;
evaluating component compliance; or
evaluating one or more of component reputation and data reputation.

\* \* \* \* \*